(12) United States Patent
Li

(10) Patent No.: US 11,112,560 B2
(45) Date of Patent: Sep. 7, 2021

(54) LED SIDE-LUMINESCENCE PANEL LAMP

(71) Applicant: LEDLUCKY Holdings Company Ltd., Guangdong (CN)

(72) Inventor: Jinming Li, Guangdong (CN)

(73) Assignee: LEDLUCKY Holdings Company Ltd., Shenzhen (CN)

( * ) Notice: Subject to any disclaimer, the term of this patent is extended or adjusted under 35 U.S.C. 154(b) by 153 days.

(21) Appl. No.: 16/468,477

(22) PCT Filed: Dec. 22, 2017

(86) PCT No.: PCT/CN2017/117954
§ 371 (c)(1),
(2) Date: Jun. 11, 2019

(87) PCT Pub. No.: WO2019/119405
PCT Pub. Date: Jun. 27, 2019

(65) Prior Publication Data
US 2020/0400875 A1 Dec. 24, 2020

(51) Int. Cl.
*F21V 8/00* (2006.01)

(52) U.S. Cl.
CPC ......... *G02B 6/0088* (2013.01); *G02B 6/0051* (2013.01); *G02B 6/0073* (2013.01); *G02B 6/0085* (2013.01)

(58) Field of Classification Search
CPC .. G02B 6/0088; G02B 6/0051; G02B 6/0073; G02B 6/0085
See application file for complete search history.

(56) References Cited

U.S. PATENT DOCUMENTS

2010/0220497 A1\* 9/2010 Ngai .................. G02B 6/002
362/610

FOREIGN PATENT DOCUMENTS

| CN | 103534527 A | 1/2014 |
|---|---|---|
| CN | 203836637 U | 9/2014 |

(Continued)

OTHER PUBLICATIONS

International Search Report for corresponding international application No. PCT/CN2017/117954.

*Primary Examiner* — Anabel Ton
(74) *Attorney, Agent, or Firm* — Westman, Champlin & Koehler, P.A.

(57) ABSTRACT

The present invention discloses a side-emitting LED panel lamp, where the side-emitting LED panel lamp includes a frame, a light-emitting element, a driving power supply, a backboard, a pressing bar, a light guide plate, and a diffusion plate; the light-emitting element, the driving power supply, and the backboard are disposed on a lower surface of the frame; the pressing bar is disposed around the backboard and covers the driving power supply; the driving power supply is electrically connected to the light-emitting element; the light guide plate is disposed on a lower surface of the backboard; the light guide plate is flush with the light-emitting element; and the diffusion plate is disposed on a lower surface of the light guide plate. In the present invention, all the components are integrally assembled. When used, the side-emitting LED panel lamp can be directly connected to a mains power supply, so as to avoid lamp damage caused because the light-emitting element does not match the driving power supply due to secondary adjustment, therefore facilitating a direct operation of a user.

19 Claims, 2 Drawing Sheets

(56) References Cited

FOREIGN PATENT DOCUMENTS

| | | | |
|---|---|---|---|
| CN | 205048284 U | | 2/2016 |
| CN | 105650549 A | * | 6/2016 |
| CN | 205664193 U | | 10/2016 |
| CN | 205716700 U | | 11/2016 |
| CN | 205979395 U | | 2/2017 |
| CN | 206469143 U | | 9/2017 |
| CN | 206637493 U | | 11/2017 |
| WO | WO-2012009918 A1 | * | 1/2012 ............... F21K 9/00 |

* cited by examiner

LED SIDE-LUMINESCENCE PANEL LAMP

TECHNICAL FIELD

The present invention relates to the field of LED luminescence technologies, and in particular, to a side-emitting LED panel lamp.

BACKGROUND

Currently, an output parameter of a power drive has already been matched with an input parameter of a lamp when design starts, and each type of LED panel lamp can operate normally only after having been matched with a driving power supply. However, secondary processing further needs to be performed on an existing side-emitting LED panel lamp before the side-emitting LED panel lamp is used by a customer. This easily leads to burn-in because the driving power supply is not matched with the lamp during processing, resulting in damage to a device and a waste of materials.

SUMMARY

An objective of the present invention is to provide a side-emitting LED panel lamp, so that a lamp can be directly connected to a mains power supply when used.

To achieve the above objective, the present invention provides the following technical solutions.

A side-emitting LED panel lamp includes a frame, a light-emitting element, a driving power supply, a backboard, a pressing bar, a light guide plate, and a diffusion plate, where the light-emitting element, the driving power supply, and the backboard are disposed on a lower surface of the frame; the pressing bar is disposed around the backboard and covers the driving power supply; and the driving power supply is electrically connected to the light-emitting element; and the light guide plate is disposed on a lower surface of the backboard; the light guide plate is flush with the light-emitting element; and the diffusion plate is disposed on a lower surface of the light guide plate.

Optionally, the frame includes two first frame strips and two second frame strips; the first frame strips and the second frame strips are connected head to tail; and the first frame strip is provided with a groove, and forms accommodating space with the pressing bar for placing the driving power supply; and the light-emitting element is disposed on the second frame strip.

Optionally, the first frame strips and the second frame strips are integratedly connected through welding.

Optionally, the frame is rectangular or square.

Optionally, the side-emitting LED panel lamp further includes:

a thermally conductive adhesive layer disposed between the light-emitting element and the second frame strip.

Optionally, the side-emitting LED panel lamp further includes:

a buffer layer disposed between the light guide plate and the backboard.

Optionally, the buffer layer is made of buffer cotton.

Optionally, the pressing bar and the frame are connected through screws.

Optionally, a frosted structure or a prism structure is disposed on a surface of the diffusion plate.

Optionally, the light-emitting element is a white light LED lamp bead.

According to specific embodiments provided in the present invention, the present invention discloses the following technical effects:

The side-emitting LED panel lamp in the present invention is successively provided with a diffusion plate, a light guide plate, a backboard, a pressing bar, and a frame, and a light-emitting element and a driving power supply are disposed on a lower surface of the frame; the light-emitting element is electrically connected to the driving power supply, so that the pressing bar covers the driving power supply, so that all the components are integrally assembled. When used, the side-emitting LED panel lamp can be directly connected to a mains power supply, so as to avoid lamp damage caused because the light-emitting element does not match the driving power supply due to secondary adjustment, therefore facilitating a direct operation of a user.

DRAWINGS

The present invention will be explained in detail with reference to the accompanying drawings.

REFERENCE NUMERAL DESCRIPTION

Figure 1:
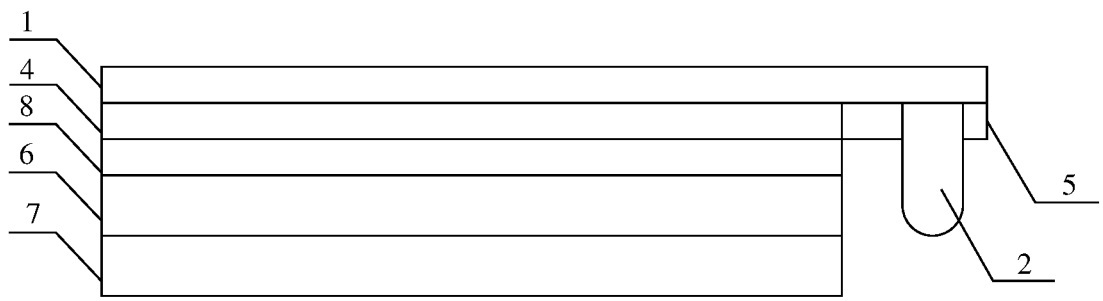
FIG. 1 is a front view of a side-emitting LED panel lamp according to an embodiment of the present invention.

Frame—1, light-emitting element—2, driving power supply—3, backboard—4, pressing bar—5, light guide plate—6, diffusion plate—7, and buffer layer—8.

DETAILED DESCRIPTION

The following describes in detail the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art without creative efforts on the basis of the embodiments of the disclosure shall fall within the scope of protection of the disclosure.

An objective of the present invention is to provide a side-emitting LED panel lamp, where the side-emitting LED panel lamp is successively provided with a diffusion plate, a light guide plate, a backboard, a pressing bar, and a frame, and a light-emitting element and a driving power supply are disposed on a lower surface of the frame; the light-emitting element is electrically connected to the driving power supply, so that the pressing bar covers the driving power supply, so that all the components are integrally assembled. When used, the side-emitting LED panel lamp can be directly connected to a mains power supply, so as to avoid lamp damage caused because the light-emitting element does not match the driving power supply due to secondary adjustment, therefore facilitating a direct operation of a user.

To make the foregoing objective, features, and advantages of the present invention clearer and more comprehensible, the present invention is further described in detail below with reference to the accompanying drawings and specific embodiments.

As shown in FIG. 1 to FIG. 4, a side-emitting LED panel lamp in the present invention includes a frame 1, a light-emitting element 2, a driving power supply 3, a backboard 4, a pressing bar 5, a light guide plate 6, and a diffusion plate 7.

Figure 5:
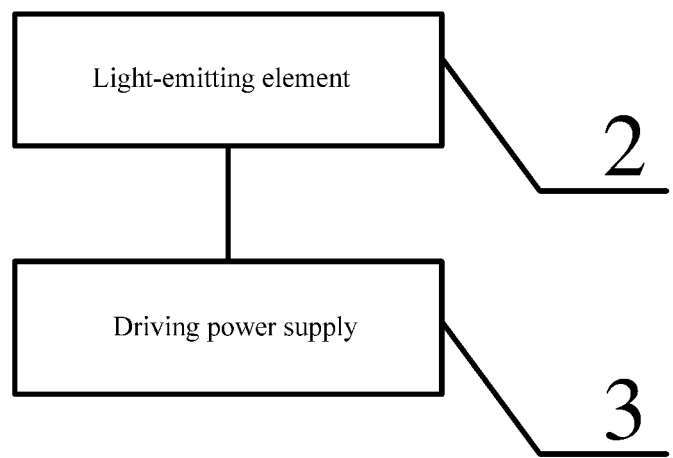
FIG. 5 is a circuit connection diagram of a side-emitting LED panel lamp according to an embodiment of the present invention.

The light-emitting element 2, the driving power supply 3, and the backboard 4 are disposed on a lower surface of the frame 1; the pressing bar 5 is disposed around the backboard 4 and covers the driving power supply 3; and the driving power supply 3 is electrically connected to the light-emitting element 2 (as shown in FIG. 5). The pressing bar 5 and the frame 1 are connected through screws. In this embodiment, the light-emitting element 2 is a white light LED lamp bead.

The light guide plate 6 is disposed on a lower surface of the backboard 4; the light guide plate 6 is flush with the light-emitting element 2; and the diffusion plate 7 is disposed on a lower surface of the light guide plate 6. Specifically, a frosted structure or a prism structure is disposed on a surface of the diffusion plate 7.

Figure 2:
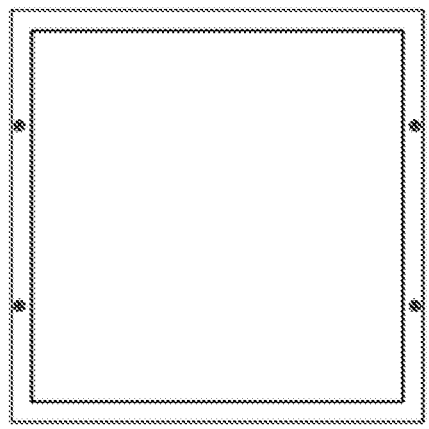
FIG. 2 is a top view of a side-emitting LED panel lamp according to an embodiment of the present invention.
Figure 3:
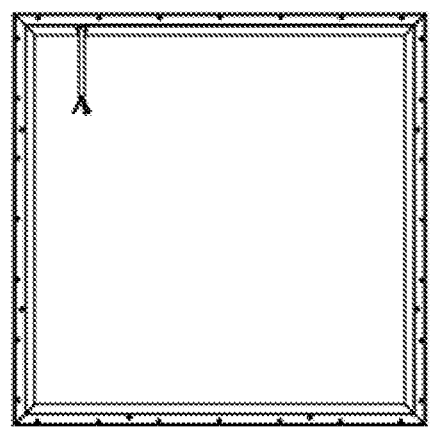
FIG. 3 is a bottom view of a side-emitting LED panel lamp according to an embodiment of the present invention.
Figure 4:
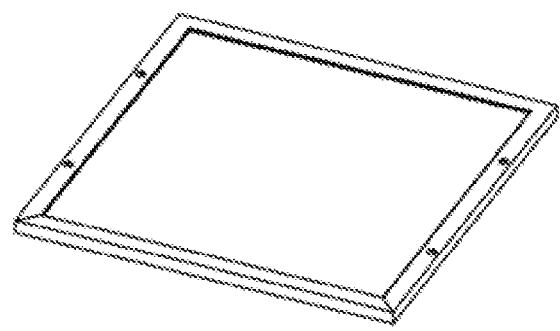
FIG. 4 is a space diagram of a side-emitting LED panel lamp according to an embodiment of the present invention.

Preferably, the frame 1 includes two first frame strips and two second frame strips; the first frame strips and the second frame strips are connected head to tail (as shown in FIG. 2 to FIG. 4); the first frame strip is provided with a groove, and forms accommodating space with the pressing bar 5 for placing the driving power supply 3; and the light-emitting element 2 is disposed on the second frame strip.

Specifically, the first frame strips and the second frame strips are integratedly connected through welding. In other words, the frame 1 is integrated through welding. In this embodiment, the frame 1 is rectangular or square.

The light-emitting element 2 may fit to a closed side of the second frame strip. Further, the side-emitting LED panel lamp in the present invention further includes a thermally conductive adhesive layer, where the thermally conductive adhesive layer is disposed between the light-emitting element 2 and the second frame strip. The thermally conductive adhesive layer is usually made of thermally conductive double-faced adhesive.

Preferably, the side-emitting LED panel lamp in the present invention further includes a buffer layer 8, where the buffer layer 8 is disposed between the light guide plate 6 and the backboard 4. In this embodiment, the buffer layer 8 is made of buffer cotton.

In the present invention, the driving power supply and the light-emitting element are assembled together, so as to effectively resolve a placement problem of a power drive during use of a lamp, and avoid secondary adjustment on the lamp, thereby reducing man-made damage.

Compared with the prior art, the vehicle speed inducible system based on traffic lights and the vehicle in the present invention have same beneficial effects as the foregoing vehicle speed inducible method based on traffic lights. Details are not repeated herein.

The embodiments of the disclosure are described in detail above with reference to the accompanying drawings, but the disclosure is not limited to the above embodiments. Within the knowledge of a person of ordinary skill in the art, various variations can also be made without departing from the spirit of the disclosure.

What is claimed is:

1. A side-emitting LED panel lamp, wherein the side-emitting LED panel lamp comprises a frame, a light-emitting element, a driving power supply, a backboard, a pressing bar, a light guide plate, and a diffusion plate;

the light-emitting element, the driving power supply, and the backboard are disposed on a lower surface of the frame; the pressing bar is disposed around the backboard and covers the driving power supply, wherein the pressing bar and the frame are connected through screws; and the driving power supply is electrically connected to the light-emitting element; and the light guide plate is disposed on a lower surface of the backboard; the light guide plate is flush with the light-emitting element; and the diffusion plate is disposed on a lower surface of the light guide plate.

2. The side-emitting LED panel lamp according to claim 1, wherein the frame comprises two first frame strips and two second frame strips;

the first frame strips and the second frame strips are connected head to tail; and the first frame strip is provided with a groove, and forms accommodating space with the pressing bar for placing the driving power supply; and the light-emitting element is disposed on the second frame strip.

3. The side-emitting LED panel lamp according to claim 2, wherein the first frame strips and the second frame strips are integratedly connected through welding.

4. The side-emitting LED panel lamp according to claim 2, wherein the frame is rectangular or square.

5. The side-emitting LED panel lamp according to claim 2, wherein the side-emitting LED panel lamp further comprises:

a thermally conductive adhesive layer disposed between the light-emitting element and the second frame strips.

6. The side-emitting LED panel lamp according to claim 1, wherein the side-emitting LED panel lamp further comprises:

a buffer layer disposed between the light guide plate and the backboard.

7. The side-emitting LED panel lamp according to claim 6, wherein the buffer layer is made of buffer cotton.

8. The side-emitting LED panel lamp according to claim 1, wherein a frosted structure or a prism structure is disposed on a surface of the diffusion plate.

9. The side-emitting LED panel lamp according to claim 1, wherein the light-emitting element is a white light LED lamp bead.

10. The side-emitting LED panel lamp according to claim 2, wherein the light-emitting element is a white light LED lamp bead.

11. The side-emitting LED panel lamp according to claim 3, wherein the light-emitting element is a white light LED lamp bead.

12. The side-emitting LED panel lamp according to claim 4, wherein the light-emitting element is a white light LED lamp bead.

13. The side-emitting LED panel lamp according to claim 5, wherein the light-emitting element is a white light LED lamp bead.

14. The side-emitting LED panel lamp according to claim 6, wherein the light-emitting element is a white light LED lamp bead.

15. The side-emitting LED panel lamp according to claim 7, wherein the light-emitting element is a white light LED lamp bead.

16. The side-emitting LED panel lamp according to claim 1, wherein the light-emitting element is a white light LED lamp bead.

17. The side-emitting LED panel lamp according to claim 8, wherein the light-emitting element is a white light LED lamp bead.

18. A side-emitting LED panel lamp, wherein the side-emitting LED panel lamp comprises:
   a frame, a light-emitting element, a driving power supply, a backboard, a pressing bar, a light guide plate, a diffusion plate, and a buffer layer disposed between the light guide plate and the backboard;
   the light-emitting element, the driving power supply, and the backboard are disposed on a lower surface of the frame; the pressing bar is disposed around the backboard and covers the driving power supply; and the driving power supply is electrically connected to the light-emitting element; and
   the light guide plate is disposed on a lower surface of the backboard; the light guide plate is flush with the light-emitting element; and the diffusion plate is disposed on a lower surface of the light guide plate.

19. The side-emitting LED panel lamp according to claim 18, wherein the buffer layer is made of buffer cotton.

* * * * *